Jan. 9, 1968  P. J. CLIFFORD ET AL  3,362,085
DUMP TRAILER WITH AIR FLOW DRYING MEANS
Original Filed May 20, 1963  4 Sheets-Sheet 1
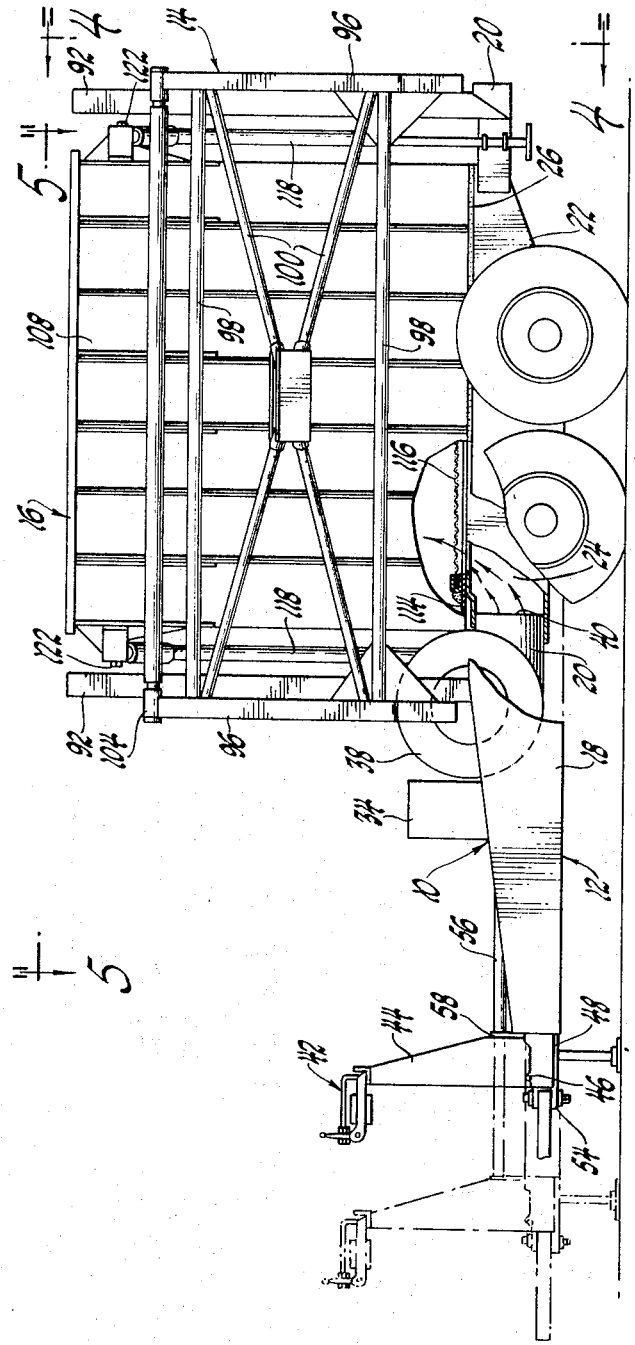
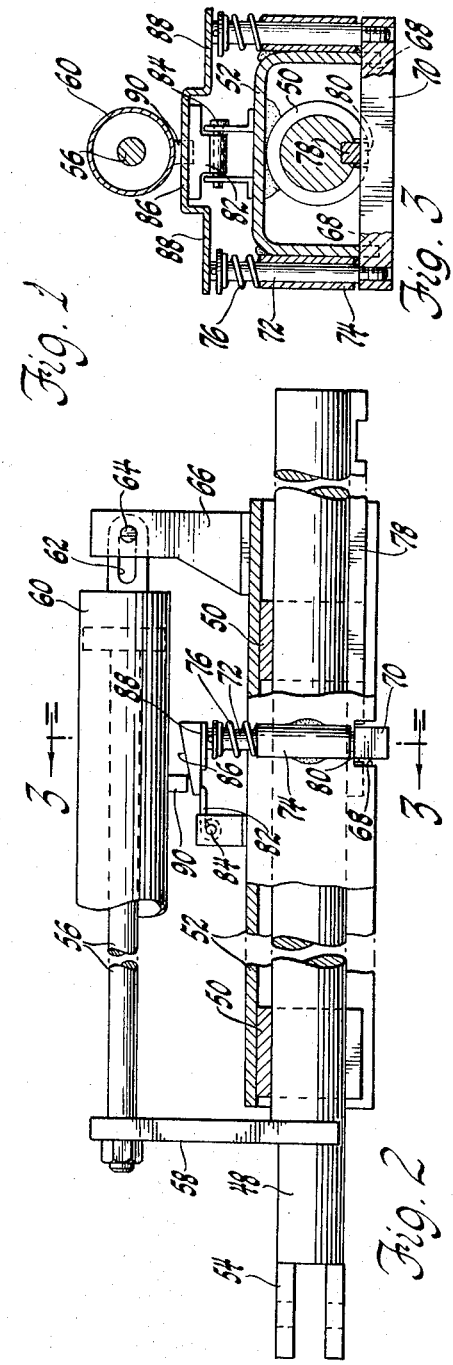
INVENTORS
Peter J. Clifford, &
Benson J. Lamp
Barnard, McGlynn & Reising
ATTORNEYS

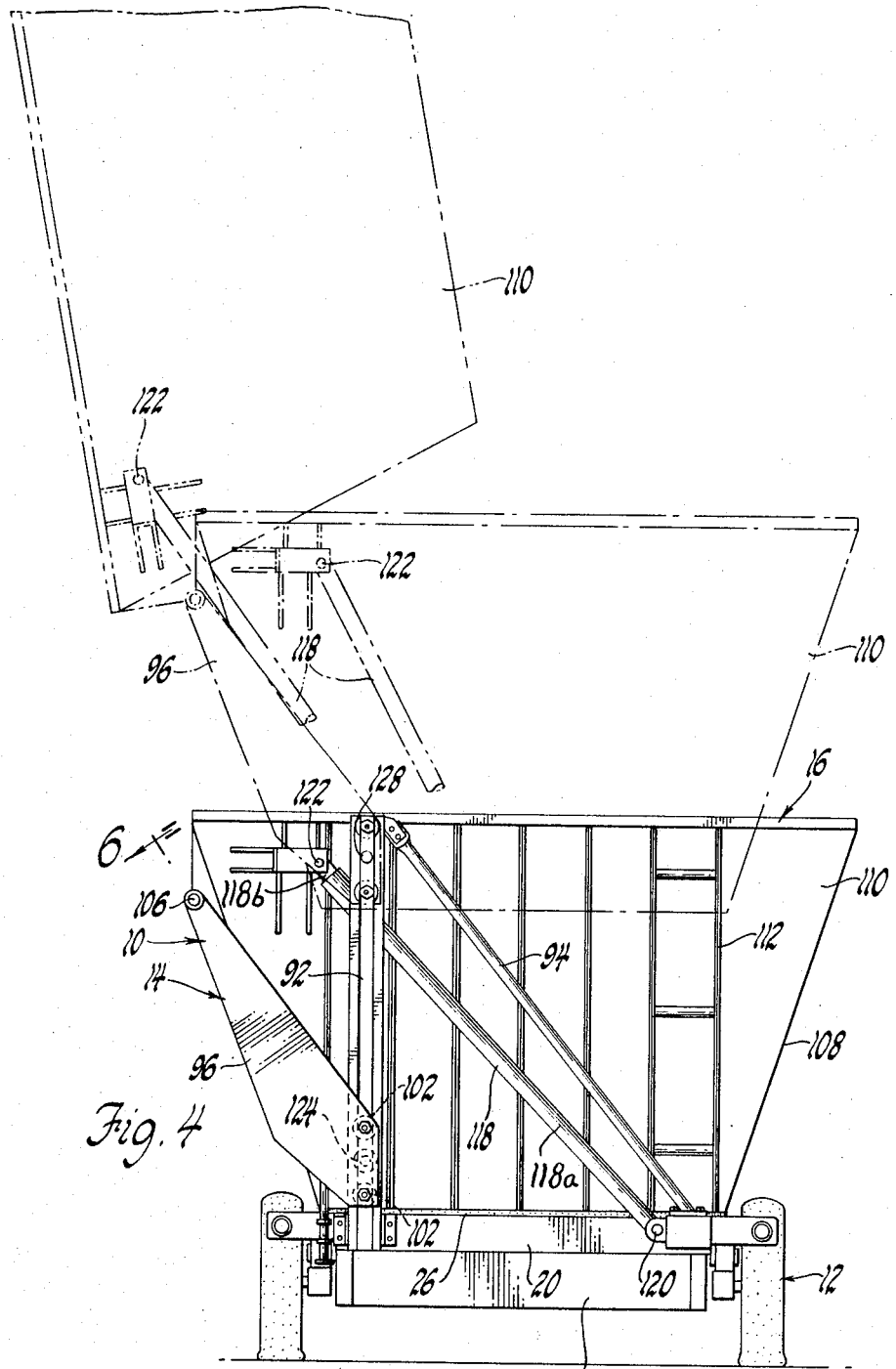

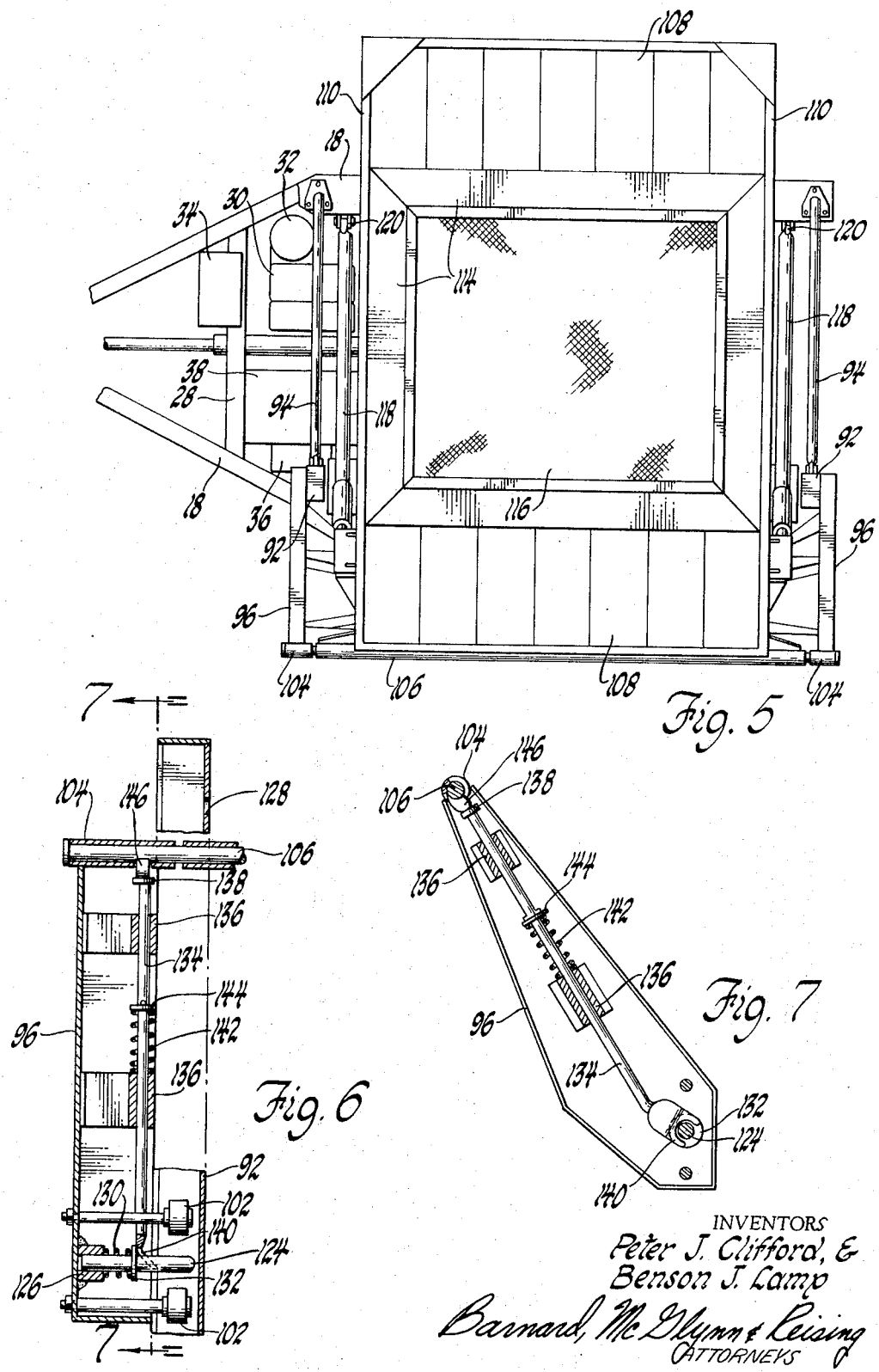

INVENTORS
Peter J. Clifford, &
Benson J. Lamp

Barnard, McGlynn & Reising
ATTORNEYS

United States Patent Office 3,362,085
Patented Jan. 9, 1968

1

3,362,085
DUMP TRAILER WITH AIR FLOW
DRYING MEANS
Peter J. Clifford, Fresno, Calif., and Benson J. Lamp,
Birmingham, Mich., assignors to Massey-Ferguson Inc.,
Detroit, Mich., a corporation of Maryland
Continuation of application Ser. No. 287,168, May 20,
1963. This application July 14, 1966, Ser. No. 565,320
30 Claims. (Cl. 34—90)

ABSTRACT OF THE DISCLOSURE

A mobile dump trailer comprising a chassis including ground-engaging wheel means, a guide frame fixed to the chassis and a carriage mounted on the guide frame for movement therealong between raised and lowered positions. A portion of the carriage is located laterally beyond the guide frame to the extent of being at least over the center of the wheel means, and a dump bin is pivotally mounted on such portion of the carriage for movement in unison with the latter between the aforementioned raised and lowered positions thereof. Moreover, the dump bin is pivotally moveable relative to the carriage between a load-carrying position and a dumping position. The top of the bin is disposed in a plane at least as high as the upper end of the guide frame with the carriage disposed in its lowered position. Carriage operating means, comprising relatively reciprocable members, is directly connected between the chassis and bin. The carriage operating means is extensible to move the bin and carriage in unison to the raised position of the latter on the guide frame followed automatically by pivotal movement of the bin to the dumping position thereof. The carriage operating means is contractable to pivot the bin from its dumping position to its load-carrying position followed automatically by lowering movement of the bin and carriage in unison to the lowered position of the latter on the guide frame.

This application is a continuation of Ser. No. 287,168 filed May 20, 1963, and now abandoned.

The present invention particularly contemplates a dump trailer or wagon adapted to be towed behind an agricultural harvesting apparatus for discharge of the harvested crop thereinto by means of the usual elevator-type conveyor for transport until such time as it is desired to dump or discharge the harvested crop. Accordingly, in order to facilitate an understanding of the invention, reference will be made hereinafter primarily to the use of such a dump trailer or wagon in an agricultural environment. However, and as will become readily apparent hereinafter as the description proceeds, the dump trailer of the present invention may be utilized in receiving, transporting and dumping materials or loads other than those of an agricultural nature.

In harvesting various types of agricultural crops, it is highly desirable to utilize equipment and methods whereby the harvesting process from the field to the ultimate storage containers or areas is as continuous as possible. To this end, and referring to the field wafering of forage crops by way of example, it is extremely desirable to be able to pick up mown hay in a field, wafer it, discharge the hay wafers into a trailing conveyance which can be emptied periodically into additional vehicular convey-

2 ances for transport of the wafers to a storage area or container. To accomplish this purpose, it has been proposed to utilize dump trailers trailing the harvesting or wafering apparatus to receive completed hay wafers from the usual associated elevator-type conveyor projecting over the open top of the dump bin carried by the trailer, the dump bin being selectively movable between a relatively low level load-receiving and carrying position to a raised high lift dumping position for discharge of the contents thereof.

More specifically in this regard, one type of dump trailer heretofore proposed for agricultural use has comprised a chassis adapted to be hitched to a towing vehicle or harvesting apparatus, a guide frame fixed to and upstanding from one side portion of the chassis, a carriage mounted on the aforementioned guide frame for raising and lowering movement therealong, a dump bin having an open top and pivotally mounted on the aforementioned carriage for movement in unison therewith and being pivotal relative thereto between a load-carrying position and a dumping position, and means for controlling raising and lowering movement of the carriage and dump bin characterized by a first hydraulic cylinder connected between the chassis and an intermediate or idler frame member to control raising and lowering movement of the latter, and a second hydraulic cylinder connected between the aforementioned intermediate or idler frame member and the dump bin to control movement of the latter and its associated carriage in unison on the aforementioned guide frame, and additionally providing the thrust required to pivot the dump bin relative to the carriage. Furthermore, such dump trailer has also included a longitudinally shiftable drawbar member and associated hydraulic cylinder whereby, upon stopping the towing vehicle in a field when desired to dump the trailer, the drawbar may be shifted longitudinally to bodily back the dump trailer away from the towing vehicle so that the open top of the dump bin clears the overhanging lip of the elevator conveyor so as not to cause interference therewith during subsequent elevation and dumping of the dump bin.

In dump trailers of the type aforementioned, and as alluded to above, raising and lowering movement of the dump bin and carriage in unison and pivotal movement of the dump bin relative to the carriage has necessitated two different sets of hydraulic jacks operatively interconnected by an intermediate or idler frame member and, since two sets of such jacks are normally employed on such an apparatus, four relatively expensive hydraulic jacks have been required. Furthermore, upon retracting the drawbar jack to retract the drawbar and pull the trailer back toward the towing vehicle following a dumping operation, such dump jack has been required to absorb draft forces while subsequently towing the trailer which, of course, is not desirable.

Furthermore, it is desirable to at least partially cool and dry certain agricultural crops, hay wafers being an example, prior to storage thereof to prevent spoilage. To this end, it has been proposed to blow air through the open top of a conventional non-dumpable wagon for the purpose of drying and cooling to some extent the agricultural crop contained therein. In addition to the fact that the blower utilized for the purpose aforementioned, when associated with a dump-type trailer, may interfere with the dumping action of the latter, the blower can literally blow a cloud of dust from the top of the trailer due to fines and the like entrained within the crop contained therein.

In view of the foregoing considerations, the present invention is directed to mobile dump trailers adapted to be drawn behind a towing prime mover and comprising a chassis including ground-engaging wheel means, a guide frame fixed to and upstanding from one side portion of the chassis, a carriage mounted on the aforementioned guide frame for movement therealong between a raised limit position and a lowered limit position, a dump bin having an open top and pivotally mounted on the carriage for raising and lowering movement in unison therewith and being pivotal relative thereto between a load-carrying position and a dumping position, and extensible and contractable carriage or dump operating means including relatively reciprocable members respectively connected directly to the chassis and bin, and means for selectively controlling extension and contraction of such operating means to control the dumping and return action of the dump bin and associated carriage.

The invention is further characterized by the fact that a dump trailer of the general type aforementioned is provided with carriage latch means operable between the aforementioned carriage and guide frame and being operable to latch the carriage in the raised limit position thereof automatically in response to initial pivotal movement of the bin from its load-carrying position to its dumping position, and further operable automatically to unlatch the carriage in the raised limit position thereof automatically in response to concluding pivotal return movement of the bin to its load-carrying position thereof, whereby the bin and carriage are unlatched for movement in unison to the lowered limit position of the carriage.

In another of its aspects, the invention is directed to a wheel-mounted mobile dump trailer adapted to be drawn behind a towing vehicle, and characterized by a chassis including means defining a plenum chamber having an upper opening therein, a dump bin having an open top and an opposed perforate bottom wall adapted to sealingly engage the upper opening of the aforementioned plenum chamber when the bin is disposed in a low level load-receiving and carrying position on the chassis, blower means mounted on the chassis and communicating with the aforementioned plenum chamber for blowing air thereinto and therefrom through the perforate bottom wall of the bin to cool and dry material contained therein with the bin disposed in its low level load-receiving and carrying position aforementioned, and means including a carriage for elevating the bin from such position to a high level dumping positon.

In still another of its aspects, the invention is directed to a wheel-mounted mobile dump trailer adapted to be drawn behind a towing prime mover, and characterized by hitch means including a drawbar mounted on the chassis for reciprocation relative thereto between extended and retracted positions and adapted to be connected to a towing vehicle, power actuated means for moving the drawbar between such positions thereof, and drawbar latch means cooperable between the chassis and drawbar and being operable automatically to latch the chassis to the drawbar in the retracted position of the latter for the purpose of absorbing draft loads directly through the latch means and independent of the power actuated means aforementioned, while being automatically releasable in response to operation of the power actuated means in extending the drawbar.

These and other features and advantages of the invention will appear more fully hereinafter as the description thereof proceeds, reference being made to the accompanying drawings in which:

FIGURE 1 is a side elevational view of a dump trailer or wagon illustrating a preferred embodiment of the invention;

FIGURE 2 is an enlarged fragmentary view of FIGURE 1 illustrating certain details of the trailer hitch mechanism;

FIGURE 3 is a sectional view taken on line 3—3 of FIGURE 2;

FIGURE 4 is a view taken on line 4—4 of FIGURE 1, and illustrates in phantom line certain raised positions of the dump bin of the trailer;

FIGURE 5 is a view taken on line 5—5 of FIGURE 1;

FIGURE 6 is a sectional view taken generally on line 6—6 of FIGURE 4, and illustrates certain details of a carriage latch mechanism of the trailer;

FIGURE 7 is a sectional view taken on line 7—7 of FIGURE 6;

Figure 8:
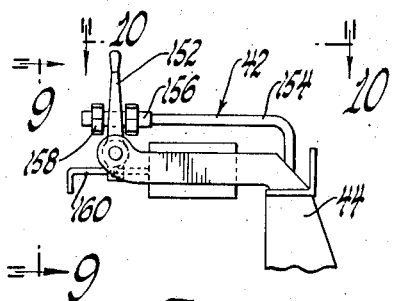
FIGURE 8 is an enlarged fragmentary view of a portion of FIGURE 1 illustrating certain details of a hydraulic control valve unit associated with the trailer.
Figure 9:
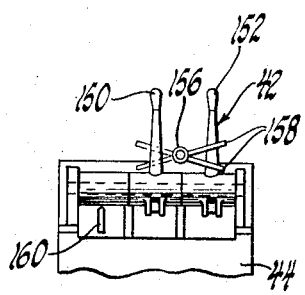
FIGURE 9 is a view taken on line 9—9 of FIGURE 8.

Referring now to the drawings, and particularly FIGURES 1 and 4 thereof, the numeral 10 generally indicates a dump trailer or wagon comprising the wheel-mounted chassis indicated at 12, the carriage frame indicated generally at 14 and the dump bin indicated generally at 16. The chassis, carriage frame and bin form independent subassemblies for the purpose of facilitating transport, storage and maintenance thereof, while being readily operatively interconnectable into the assembled unit to be described.

Referring now more specifically to the nature of the chassis 12, and with reference particularly to FIGURES 1, 4 and 5, it may be seen to comprise a pair of laterally spaced generally longitudinally extending side frame rails 18 having inwardly convergent forward portions thereof, a pair of longitudinally spaced transversely extending rear and intermediate frame rails 20 and a bottom wall 22 substantially coextensive with the rails 18 to 20 to define therewith a plenum chamber 24 having an upper opening therein defined by such rails. Sealing means 26 extend about the top surfaces of the rails defining the opening in the plenum chamber for cooperation with the bin 16 in a manner to be described.

Referring particularly to FIGURES 1 and 5, a front frame rail 28 is spaced forwardly from the intermediate frame rail 20 and interconnects the convergent portions of the side rails 18, while a hydraulic power unit and blower fan are suitably mounted on the chassis 12 between the convergent portions of the side rails aforedescribed. Thus, the numeral 30 indicates an internal combustion engine driving the main hydraulic power pump 32 of a hydraulic system including the reservoir 34 and a hydraulic blower motor 36 suitably coupled to a conventional centrifugal blower fan 38 having its discharge opening communicating through an opening 40 in the intermediate frame rail 20 with the aforedescribed plenum chamber 24. The hydraulic system, to be described in further detail hereinafter, includes the control valve unit indicated generally at 42 as being carried by the upper end of a pedestal 44 hingedly connected at 46 to the extreme forward portion of a drawbar rod 48 slidably mounted on the chassis in a manner to be described. Thus, the trailer may be hitched to a towing vehicle in a manner to be described hereinafter in which event the pedestal 44 will be disposed in an upright position to dispose the control valve unit 42 in position for operation by the operator of the towing vehicle. On the other hand, in the event that the trailer is to be towed by harvesting equipment or the like which in turn is coupled to a towing vehicle, the entire control valve unit 42 may be removed from the pedestal 44 which then may be pivoted down onto the chassis out of the way of interference with the harvesting unit connected in front thereof, and the valve unit transferred to the rear of the towing vehicle utilizing conventional quick-attach hose couplings at the latter position. A conventional vertically adjustable foot member is carried at the forward ends of the drawbar rod 48 to support the forward portion of the chassis when uncoupled from a towing vehicle.

Referring particularly to FIGURES 1 through 3, the aforementioned drawbar or cylindrical rod 48 is suitably mounted as by bearing sleeves 50 respectively secured within a drawbar housing 52 extending between and rigidly secured to front rail 28 and intermediate rail 20 for longitudinal reciprocation relative to the chassis 12 between an extreme retracted position as illustrated in full line in FIGURE 1 and in FIGURES 2 and 3, and an extreme extended position as illustrated in phantom in FIGURE 1. The forward end of the drawbar rod 48 includes a conventional hitch construction 54 for coupling the trailer to the preceding towing vehicle or harvesting apparatus as the case may be. A double acting hydraulic drawbar shift jack includes the reciprocable piston 56 having one end thereof connected as indicated at 58 to a forward portion of the drawbar or rod 48 and the cylinder member 60 connected to the chassis as by means of an elongated slot 62 receiving a pin 64 mounted in a bracket 66 fixed to the drawbar housing 52. As will appear more fully hereinafter, with the hitch 52 connected to a towing vehicle or the like which is immobile, the jack may be extended to extend the drawbar rod 48 thereby bodily shifting the entire trailer rearwardly from the towing unit to clear any overhanging elevator conveyor utilized for discharging material into the bin 16. Conversely, the jack may be retracted to again draw the trailer toward the towing unit and into operative position beneath the overhanging elevator conveyor.

Latch means are provided for latching the drawbar or rod 48 in its fully retracted position directly to the chassis 12 to transmit draft loads directly therebetween while pulling the trailer along a field or the like. Such latch means comprises the aforementioned housing 52 which is generally of an inverted U-shape in cross section, each side wall of the housing including laterally oppositely disposed depending locking notches 68. A latch bar 70 extends transversely between the notches 68 and at each lateral end thereof includes upright guide rods 72 reciprocably mounted within guide sleeves 74 carried on the outer side walls of the housing 52. Spring means 76 act between the respective guide sleeves 74 and the upper ends of the guide rods 72 to continuously urge latch bar 70 into the notches 68. A longitudinally extending key bar 78 is fixed to the underside of the drawbar or rod 48 and includes a locking notch 80 therein. The relation of the notch 80 in the key bar 78 relative to the notches in the housing 52 is such that, upon full retraction of the drawbar 48 as illustrated in FIGURES 2 and 3, all three of the respective locking notches are transversely aligned to receive the latch bar 70 thereby to latch the drawbar directly to the chassis.

In order to automatically control latching and unlatching of the drawbar latch aforedescribed, there is provided a latch operator 82 pivotally mounted at 84 to the upper wall of the housing 52 and including a central inclined cam follower member 86 and wing members 88 overlying the upper ends of the guide rods 72. In addition, a cam lug 90 is provided on the cylinder 60 of the drawbar shift jack for selective engagement and disengagement with the cam follower member 86 to depress wing members 88 and the latch bar 70 against the influence of the springs 76 and, conversely, to release the latch bar for movement toward a latching position under the influence of such springs. Thus, with the drawbar 48 in its normal fully retracted position as illustrated in FIGURES 2 and 3, supply of fluid under prsesure to the piston head side of the shift jack to initiate extension of the latter and the drawbar initially results in shifting of the cylinder 60 to the right in FIGURE 2 as limited by engagement of one end of the slot 62 with the pin 64, during which movement the cam 90 engages cam follower 86 and pivots latch operator 82 clockwise to reciprocate the latch bar 70 out of engagement with the locking notches 68 on the housing 52 and the locking notch 80 on the drawbar key bar 78. Thereafter, continued supply of fluid under pressure to the jack causes the latter to extend the drawbar, during which time the cam 90 continues to hold the latch bar 70 sufficiently out of the respective latching notches 68 so as not to ride along the moving surface of the key bar 78.

In retracting the drawbar, the piston rod side of the shift jack is pressurized resulting initially in bodily shifting movement of the cylinder to the left in FIGURE 2 as limited by engagement of the other end of the slot 62 with the pin 64 further resulting in movement of the cam 90 away from the cam follower 86 to the positions illustrated. As a result, the latch bar 70 is permitted to move under the influence of the springs 76 at least partway into the respective locking notches 68 on the housing 52 so as to ride against the surface of the key bar 78. Further supply of fluid under pressure to the piston rod side of the jack results in retraction of the drawbar to its fully retracted position of FIGURES 2 and 3 at which time the key bar locking notch 80 is aligned with the locking notches in the housing permitting the springs 76 to automatically bias the latch bar into latching position, thereby again coupling the drawbar 48 directly to the chassis independent of the hydraulic force of the shift jack.

Referring now particularly to FIGURES 1, 4 and 5, a pair of longitudinally spaced guide tracks 92 have their lower ends fixedly secured to one of the side rails 18 adjacent the respective frame rails 20 and extend substantially vertically upright in the plane of the associated side rail 18. Bracing rods 94 extend diagonally from the opposite side rail 18 to the upper ends of the guide tracks 92 to stabilize the latter on the chassis.

The aforementioned carriage frame 14 comprises a pair of longitudinally spaced carriage arms 96 rigidly interconnected by the longitudinally extending brace bars 98 and cross bar construction 100, and have lower end portions thereof suitably slidably mounted within the respective guide tracks 92 as by rollers 102 indicated in FIGURE 6 for rectilinear raising and lowering movement therealong between a raised upper limit at the upper end of the respective tracks and a lower limit adjacent the lower ends of the tracks with the bin 16 seated on the chassis as will be described. The respective carriage arms 96 extend laterally outwardly and upwardly from the respective guide frames 92 and include bearings 104 at their other end portions supporting rotatable shaft 106 suitably rigidly secured to one lateral side wall of the dump bin 16.

The dump bin 16 includes the laterally spaced longitudinally extending side walls 108 and longitudinally spaced laterally extending front and rear walls 110, a ladder 112 being provided on the latter. The aforedescribed wall construction defines at the upper end thereof an open top for the bin, the latter converging laterally inwardly from such open top in accordance with the configuration of the side walls 108 and terminating in an opposed bottom wall 114 including the screen 116. As illustrated in FIGURE 1, with the carriage frame 14 and bin 16 in their lowermost load-receiving and carrying position, the bottom wall 114 of the bin seats upon the aforementioned upper opening of the plenum chamber 24 and on the seal means 26 with screen 116 communicating with such opening, whereby air blowing into the plenum chamber from the blower 38 may pass through the screen 116 and up through the contents of the bin for the purpose of cooling and drying same. A pair of single acting hydraulic lift jacks 118 respectively have their cylinder members 118a pivotally connected as indicated at 120 to the chassis adjacent the side wall thereof opposite the carriage frame 14 and the piston elements 118b thereof pivotally connected as indicated at 122 respectively to the front and rear walls 110 of the bin.

Referring now primarily to FIGURES 6 and 7, each carriage arm 96 is provided with a latch mechanism cooperable with its associated track 92 to alternately automatically latch and unlatch the carriage frame 14 to the tracks 92 in response to pivotal movement of bin 16. The latch mechanisms are identical and comprise a latch bolt 124 mounted for reciprocation within support sleeves 126 secured to each carriage arm, and adapted to lockingly engage within locking notches 128 formed in the upper ends of the respective tracks 92 upon elevation of the carriage arms to their upper limits therein. A spring 130 acts between the sleeves 126 and a shoulder 132 formed on each latch bolt to continuously bias the latter toward the respective locking notches 128. A latch operator rod 134 is mounted for reciprocation within support sleeves 136 secured to each carriage arm, and includes a cam follower plate 138 at one end thereof and laterally inclined fork 140 at the other end thereof embracing bolt 124 and engaging shoulder 132 thereon opposite spring 130. A spring 142 acts between one of the sleeves 136 and a shoulder 144 formed or provided on each rod 134 to continuously urge the latter upwardly and the cam follower plates 138 toward cams 146 fixed to each end of shaft 106 for rotation with the latter and bin 16.

The latch is shown disengaged in FIGURES 6 and 7, and the elements thereof disposed in the relative positions they occupy at all times when the bin is cradled or nested in its load-receiving and carrying position even though the carriage 14 may be elevated or lowered on tracks 92. When bin 16 is pivoted a short distance relative to the carriage 14, as initiating a dumping action or concluding a return movement to a cradled position on the carriage, the cams 146 respectively disengage or engage follower plates 138 to control reciprocation of rods 134. When the rods are disengaged, springs 142 bias them upwardly to release bolts 124 for engagement with notches 128 under the influence of spring 130. When engaged, fork 140 cams against shoulder 138 to retract the bolts 124 from notches 128.

With the bin and carriage frame disposed in the lowermost position thereof as illustrated in solid line in FIGURE 4, fluid under pressure may be supplied from the hydraulic system to the piston head side of the lift jacks 118 to cause the piston rod members thereof to move outwardly therefrom, resulting in raising movement of the bin 16 and carriage frame 14 in unison as the latter travels upwardly in the guide tracks 92 and as limited by engagement of the carriage rollers 102 with the upper ends of the tracks as shown in the intermediate phantom line position of FIGURE 4. At this time, further extension of the lift jacks results in pivotal movement of the dump bin and its support shaft 106 relative to the carriage arms 96 and to the dumping position illustrated in the upper phantom line position of FIGURE 4. During initial pivotal movement of the dump bin as aforementioned, the cams 146 move off plates 138 to free bolts 124 which are aligned with and enter notches 128 to latch the carriage arms 96 to the guide tracks 92. After the contents of the bin are dumped, the lift jacks are retracted resulting in the bin pivoting back to its load-carrying position as illustrated in the intermediate phantom line position of FIGURE 4 whereby, during the concluding interval of pivotal travel of the bin, the cams 146 again engage the rods 134 and bias them against the influence of their associated springs 142 to retract bolts 124 out of latching engagement with the guide tracks 92. Thereafter, the bin being fully cradled on the carriage frame 14, further retraction of the lift jacks results in lowering of the bin and carriage in unison to the low level position illustrated in full lines in FIGURE 4 in which the bin is seated on the chassis over the plenum chamber as aforedescribed.

Thus, the carriage latch prevents the carriage frame 14 from moving downwardly in the tracks prior to cradling of the bin therein, the latch being automatically operable in response to an initial interval of pivotal movement of the bin away from its load-carrying position and a concluding interval of its pivotal travel back to such position.

Figure 10:
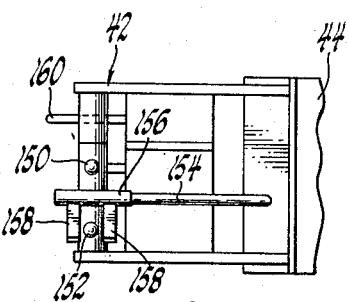
FIGURE 10 is a view taken on line 10—10 of FIGURE 8.

Referring now particularly to FIGURES 1 and 8 through 10, the valve unit 42 aforementioned is of the conventional open-center type including three shiftable valve spools respectively controlling operation of the drawbar shift jack, the bin and carriage lift control jacks 118 and the hydraulic motor 36 controlling the operation of the blower 38. The shift jack control valve is connected in the usual manner to a pivotal control lever 150 while the lift jack control spool is similarly connected to the adjacent pivotal lever 152. A mechanical interlock is provided for sequencing the operation of the respective levers 150 and 152 and their associated spools. To this end, the control pedestal 44 includes a rod 154 projecting horizontally between the respective valve levers 150 and 152, and an interlock sleeve 156 including axially spaced radially projecting lug members 158 is suitably mounted for rotation about the axis of such rod between the valve operating levers for selective engagement with one or the other thereof. Thus, with the interlock sleeve disposed as shown in FIGURE 10 with the lug members 158 embracing the lift jack valve control lever 152, the trailer operator may manipulate only the shift jack control lever 150 to extend the drawbar 48 and push the chassis rearwardly of the towing vehicle as aforedescribed to insure that the bin 16 is shifted rearwardly of any overhanging elevator conveyor prior to elevation of the bin to a dumping position. After the drawbar is so shifted, the interlock sleeve 156 is rotated, to the phantom line position of FIGURE 9 so as to embrace the shift jack control valve lever 150, thereby freeing the lift jack control lever 152 for operation through the entire dump and return cycle. Once the bin is dumped and returned to the chassis as previously described, the interlock sleeve 156 is again moved to embrace the lift jack control lever 152, thereby freeing the shift jack control valve lever 150 for manipulation to again retract the drawbar 48 and the bin 16 into operative position beneath an overhanging elevator conveyor. The interlock remains in this position in preparation for another cycle of extension of the drawbar, dumping of the bin and retraction of the drawbar as described above.

The spool valve for controlling operation of the hydraulic motor 36 driving the blower 38 is connected to the L-shaped operating rod 160. As will appear more fully hereinafter, the blower motor valve is normally biased to its open-center position preventing flow of fluid to the motor and preventing operation of the blower. When it is desired to activate the blower motor, the rod 160 is reciprocated to shift the blower motor control valve and is rotated to lock the valve in its operating position for activating the blower motor to drive the blower. Furthermore, even with the blower motor control valve shifted to the position to conduct fluid under pressure to the blower motor to drive the latter, operation of the blower motor is monitored by operation of the shift jack and lift jack control valve members as will be described hereinafter.

Figure 11:
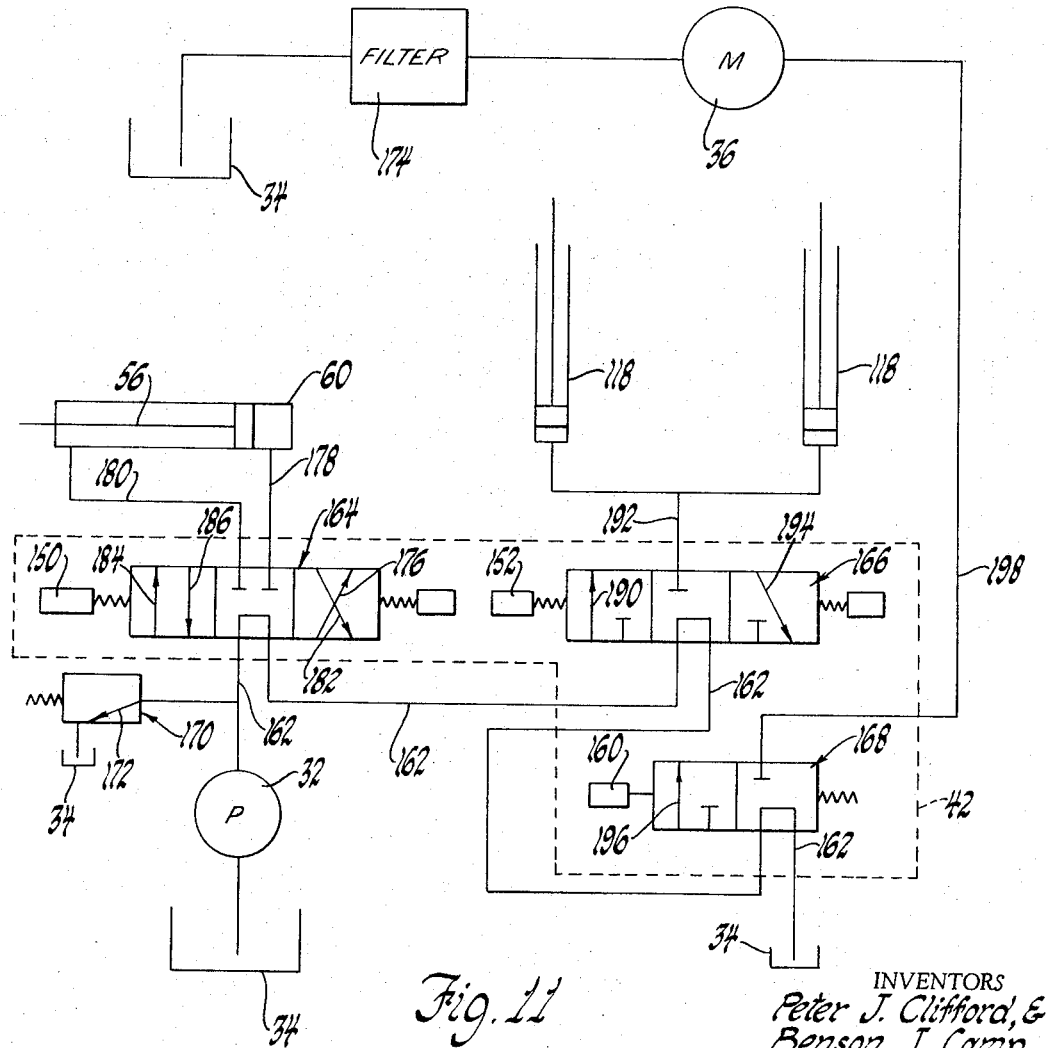
FIGURE 11 is a schematic illustration of the hydraulic system associated with the trailer.

FIGURE 11 schematically illustrates the main hydraulic pump 32, reservoir 34, blower motor 36, valve unit 42, shift jack piston 56 and cylinder 60 and lift jacks 118 previously described. As is also indicated in FIGURE 11, fluid under pressure is delivered by the pump 32 to the inlet gallery 162 of the valve unit 42 which is of the open-center type as aforementioned, whereby such fluid may flow completely through the valve unit to reservoir with the respective shift jack control valve 164, lift jack control valve 166 and blower fan motor control valve 168 in their neutral or closed positions as illustrated in the drawing. A conventional manually adjustable spring biased pressure relief valve 170 communicates with the delivery side of the pump 32 whereby, upon an increase in delivery pressure above a preselected maximum, the relief valve may shift to the left in FIGURE 11 against the influence of the spring to dump the pressure line back to reservoir through valve passage 172. In addition, FIGURE 11 also illustrates that motive fluid under pressure supplied to the blower motor 36 is returned therefrom to the reservoir 34 through the filter 174.

The shift jack control valve 164 is illustrated as being of the three-position spring biased self-centering type manually actuable through lever 150 aforedescribed, the valve being shown in its neutral position blocking any flow to and from the shift jack resulting in fluid under pressure passing therefrom down-stream to the lift jack control valve 166 and blower motor control valve 168. When it is desired to extend the drawbar 48 as previously described, the valve 164 is shifted to the left in FIGURE 11 whereby passage 176 interconnects the inlet gallery 162 to the conduit 178 leading to the piston head side of the shift jack, the rod side of the jack being vented through the conduit 180 and the valve passage 182 to the inlet gallery 162 for flow through the valve and ultimately to reservoir. Conversely, shifting of the valve to the right in FIGURE 11 results in the passage 184 connecting the delivery side of the pump through the conduit 180 to the rod side of the jack to retract the drawbar, the piston head side of the jack being exhausted through the conduit 178 and the passage 186 to the gallery 162 and ultimately to reservoir.

In similar fashion, the lift jack control valve 166 is also of the three-position spring biased self-centering spool type adapted to be shifted by control lever 152 previously described, and is shown in its neutral or closed position. When it is desired to extend the lift jacks 118, the valve is shifted to the right in FIGURE 11 to connect the delivery side of the pump through the passage 190 to the conduit 192 communicating in parallel with the piston head sides of the respective lift jacks 118. When it is desired to permit the lift jacks to retract under the influence of gravity, the valve is shifted to the left in FIGURE 11 whereby the piston head sides of the lift jacks are exhausted through the conduit 192 and the valve passage 194 to the gallery 162 for return to reservoir.

While the motor control valve 168 may conveniently be of the three-position spool type as aforedescribed, only two positions are required for operation of the motor. In FIGURE 11, the blower control valve is shown in its neutral or closed position preventing any operation whatsoever of the blower motor 36. When it is desired to activate the blower motor, the L-shaped rod 160 aforementioned is reciprocated to shift the blower control valve to the right in FIGURE 11 against the influence of the spring illustrated to place the delivery side of the pump in communication with the motor 36 through the valve passage 196 and conduit 198, rotation of rod 160 as aforedescribed serving to lock the valve in such position. When it is desired to deactivate the motor, the L-shaped control rod 152 is manipulated in a reverse direction to permit the valve to shift back to the position illustrated in FIGURE 11, thereby preventing any further operation of the motor and the blower connected thereto.

In this regard, it will be noted that the blower control valve 168 is located at the downstream end of the open center valve unit 42. Thus, both the shift jack control valve 168 and lift jack control valve 166 take precedence over the blower control valve in imposing demands on the pump. Therefore, assuming that the blower control valve is shifted to the right in FIGURE 11 to communicate the gallery 162 of the valve unit through the valve passage 196 to the motor 36, the motor will be rendered substantially if not totally ineffective for driving the blower at any time that either the shift jack or lift jacks are being operated. Such an operation is particularly desirable to disable the blower during the elevation of the bin 16 to avoid a dust problem that otherwise might occur once the bin is lifted off of the plenum chamber carried by the chassis of the trailer. Naturally, with the shift jack and lift jacks both inactive and their associated valves in their neutral open-center positions, aforementioned, the blower fan motor 36 is automatically re-energized with its associated control valve shifted to the right in FIGURE 11.

The shift jack control valve 164 and lift jack control valve 166 also include automatically engageable latch means responsive to the delivery pressure of the pump whereby, if the pump is not running, the respective shiftable valve spools of such valve members are locked in a neutral position to prevent seepage in the respective jacks and, particularly, accidental lowering of the bin and carriage mechanism without power.

The embodiments of the invention in which an exclusive property or privilege is claimed are defined as follows:

1. A mobile dump trailer comprising a chassis including ground-engaging wheel means, a guide frame fixed to said chassis, a carriage mounted on said guide frame for movement therealong between raised and lowered positions and including a portion thereof located laterally beyond said guide frame and said wheel means, a dump bin pivotally mounted on said portion of said carriage for movement in unison with the latter between said raised and lowered positions thereof and being pivotally movable relative thereto between a load-carrying position and a dumping position, and carriage operating means operatively connected between said chassis and bin, said carriage operating means being operable to move said bin and carriage in unison to the raised position of the latter on said guide frame followed automatically by pivotal movement of said bin to said dumping position thereof, and being operable to pivot said bin from said dumping position to said load-carrying position thereof followed automatically by movement of said bin and carriage in unison to the lowered position of the latter on said guide frame means.

2. The mobile dump trailer according to claim 1 further comprising carriage latch means operable between said carriage and said guide frame, said carriage latch means being operable to latch said carriage in said raised position thereof automatically in response to initial pivotal movement of said bin from said load-carrying position toward said dumping position thereof, and to unlatch said carriage in said raised position thereof automatically in response to concluding pivotal movement of said bin from said dumping position to said load-carrying position thereof.

3. The mobile dump trailer according to claim 1 wherein said chassis comprises means defining a plenum chamber having an upper opening therein, said bin including a perforate bottom wall disposed opposite said opening in said lowered position of said carriage, and means for supplying air into said plenum chamber for flow through said bottom wall of said bin in said lowered position of said carriage.

4. The mobile dump trailer according to claim 1 further comprising hitch means including a drawbar mounted on said chassis for reciprocation relative thereto between extended and retracted positions and adapted to be connected to a towing vehicle, extensible and retractable drawbar operating means operatively connected between said chassis and said drawbar to move the latter between said positions thereof, and drawbar latch means operable between said chassis and said drawbar, said drawbar latch means being operable to latch said drawbar in said retracted position thereof automatically in response to retraction of said drawbar operating means, and being operable to unlatch said drawbar automatically in response to extension of said drawbar operating means.

5. A mobile dump trailer comprising a chassis including ground-engaging wheel means, a guide frame fixed to said chassis, a carriage mounted on said guide frame for movement therealong between raised and lowered positions and including a portion thereof located laterally beyond said guide frame and said wheel means, a dump bin pivotally mounted on said portion of said carriage for movement in unison with the latter between said raised and lowered positions thereof and being pivotally movabe relative thereto between a load-carrying position and a dumping position, and extensible and contractible dump operating means directly connected between said chassis and bin, said dump operating means being operable in one direction to move said bin and carriage in unison to the raised position of the latter on said guide frame followed automatically by pivotal movement of said bin to said dumping position thereof, and being operable in the other direction to pivot said bin from said dumping position to said load-carrying position thereof followed automatically by movement of said bin and carriage in unison to the lowered position of the latter on said guide frame means.

6. A mobile dump trailer comprising a chassis including ground-engaging wheel means, a guide frame fixed to and upstanding from one side portion of said chassis, a carriage mounted on said guide frame for rectilinear movement therealong between a raised limit position and a lowered limit position, a portion of said carriage being located laterally beyond said guide frame and said wheel means, a dump bin having an open top and pivotally mounted on said portion of said carriage for movement in unison with the latter between said raised and lowered limit positions thereof and being pivotally movable relative thereto between a load-carrying position and a dumping position, and extensible and contractible carriage operating means including relatively reciprocable members respectively connected to said chassis and bin, said carriage operating means being extensible to move said bin and carriage in unison to the raised limit position of the latter on said guide frame means followed automatically by pivotal movement of said bin to said dumping position thereof, and being contractible to pivot said bin from said dumping position to said load-carrying position thereof followed automatically by lowering of said bin and carriage in unison to the lowered limit position of the latter on said guide frame means, and control means selectively controlling extension and contraction of said carriage operating means.

7. The mobile dump trailer according to claim 6 further comprising carriage latch means operable between said carriage and said guide frame, said carriage latch means being operable to latch said carriage in said raised limit position thereof automatically in response to pivotal movement of said bin from said load-carrying position toward said dumping position thereof, and to unlatch said carriage means in said raised limit position thereof automatically in response to pivotal movement of said bin from said dumping position thereof to said load-carrying position thereof.

8. The mobile dump trailer according to claim 6 further comprising carriage latch means operable between said carriage and said guide frame, said carriage latch means being operable to latch said carriage in said raised limit position thereof automatically in response to initial pivotal movement of said bin from said load-carrying position toward said dumping position thereof, and to unlatch said carriage in said raised limit position thereof automatically in response to concluding pivotal movement of said bin from said dumping position to said load-carrying position thereof.

9. The mobile dump trailer according to claim 6 wherein said chassis comprises means defining a plenum chamber having an upper opening therein, seal means surrounding said opening, said bin including a perforate bottom wall engaging said seal means in said lowered limit position of said carriage, and blower means communicating with said plenum chamber for blowing air thereinto and therefrom through said bottom wall of said bin in said lowered limit position of said carriage.

10. The mobile dump trailer according to claim 6 further comprising hitch means including a drawbar mounted on said chassis for reciprocation relative thereto between extended and retracted positions and adapted to be connected to a towing vehicle, extensible and retractable drawbar operating means operatively connected between said chassis and said drawbar to move the latter between said positions thereof, and drawbar latch means operable between said chassis and said drawbar, said drawbar latch means being operable to latch said drawbar in said retracted position thereof automatically in response to retraction of said drawbar operating means, and being operable to unlatch said drawbar automatically in response to extension of said drawbar operating means, and control means selectively controlling extension and retraction of said drawbar operating means.

11. The mobile dump trailer according to claim 10 wherein said drawbar latch means comprises a drawbar latch member mounted on said chassis for movement between latching and unlatching positions respectively relative to said drawbar, yieldable means biasing said drawbar latch member continuously toward said latching position thereof, and drawbar latch control means operable automatically in response to movement of said drawbar operating means between said positions thereof to control movement of said latch member between said positions thereof.

12. A wheel mounted mobile dump trailer comprising a chassis including means defining a plenum chamber having an upper opening therein, a dump bin having a perforate bottom wall, carriage means mounting said bin on said chassis for movement between a lowered load-carrying position in which said bottom wall of said bin is disposed opposite said opening and a raised dumping position, and means for supplying air to said plenum chamber for flow therefrom through said bottom wall of said bin in said lowered load-carrying position thereof.

13. A wheel mounted mobile dump trailer comprising a chassis including means defining a plenum chamber having an upper opening therein, a dump bin having an open top and a perforate bottom wall, carriage means mounting said bin on said chassis for movement between a lowered load-carrying position in which said bottom wall of said bin is disposed opposite said opening and a raised dumping position, and blower means mounted on said chassis communicating with said plenum chamber for blowing air therethrough and through said bottom wall of said bin in said lowered load-carrying position thereof.

14. A wheel mounted mobile dump trailer comprising a chassis, hitch means including a drawbar mounted on said chassis for reciprocation relative thereto between extended and retracted positions and adapted to be connected to a towing vehicle, extensible and retractable drawbar operating means operatively connected between said chassis and said drawbar to move the latter between said positions thereof, and drawbar latch means between said chassis and said drawbar, said drawbar latch means being operable to latch said drawbar in said retracted position thereof automatically in response to retraction of said drawbar operating means, and to unlatch said drawbar automatically in response to extension of said drawbar operating means.

15. The dump trailer according to claim 14 wherein said drawbar latch means comprises a drawbar latch member mounted on said chassis for movement between latching and unlatching positions respectively relative to said drawbar, yieldable means biasing said drawbar latch member continuously toward said latching position thereof, and drawbar latch control means operable automatically in response to movement of said drawbar operating means between said positions thereof to control movement of said latch member between said positions thereof.

16. A mobile wheel mounted dump trailer comprising a chassis, a dump bin having an open top, carriage means mounting said bin on said chassis for movement between a lowered load-carrying position and a raised dumping position, said carriage means including a fluid pressure operated lift control jack, hitch means including a drawbar mounted on said chassis for reciprocation relative thereto between extended and retracted positions and adapted to be connected to a towing vehicle, a fluid pressure operated drawbar control jack controlling movement of said drawbar between said positions thereof, means including a lift jack control valve and a drawbar jack control valve independently actuable for selectively controlling supply of fluid under pressure to said respective jacks, and interlock means controlling actuation of said respective control valves, said interlock means having a first position preventing actuation of said lift jack control valve during actuation of said drawbar jack control valve, and a second position preventing actuation of said drawbar jack control valve during actuation of said lift jack control valve.

17. A mobile dump trailer comprising a chassis including ground-engaging wheel means, a guide frame fixed to said chassis, a carriage mounted on said guide frame for movement therealong between raised and lowered positions, a dump bin pivotally mounted on said carriage for movement in unison with the latter between said raised and lowered positions thereof and being pivotally movable relative thereto between a load-carrying position and a dumping position, carriage operating means operatively connected between said chassis and bin, said carriage operating means being operable to move said bin and carriage in unison to the raised position of the latter on said guide frame followed automatically by pivotal movement of said bin to said dumping position thereof, and being operable to pivot said bin from said dumping position to said load-carrying position thereof followed automatically by movement of said bin and carriage in unison to the lowered position of the latter on said guide frame, hitch means including a drawbar mounted on said chassis for reciprocation relative thereto between extended and retracted positions and adapted to be connected to a towing vehicle, extensible and retractable drawbar operating means operatively connected between said chassis and said drawbar to move the latter between said positions thereof, and drawbar latch means operable between said chassis and said drawbar, said drawbar latch means being operable to latch said drawbar in said retracted position thereof automatically in response to retraction of said drawbar operating means, and being operable to unlatch said drawbar automatically in response to extension of said drawbar operating means.

18. A mobile dump trailer comprising a chassis including ground-engaging wheel means, a guide frame fixed to and upstanding from one side portion of said chassis, a carriage mounted on said guide frame for rectilinear movement therealong between a raised limit position and a lowered limit position, a dump bin having an open top and pivotally mounted on said carriage for movement in unison with the latter between said raised and lowered limit positions thereof and being pivotally movable relative thereto between a load-carrying position and a dumping position, extensible and contractible carriage operating means including relatively reciprocable members respectively connected to said chassis and bin, said carriage operating means being extensible to move said bin and carriage in unison to the raised limit position of the latter on said guide frame followed automatically by pivotal movement of said bin to said dumping position thereof, and being contractible to pivot said bin from said dumping position to said load-carrying position thereof followed automatically by lowering of said bin and carriage in unison to the lowered limit position of the latter on said guide frame, control means selectively controlling extension and contraction of said carriage operating means, said chassis including means defining a plenum chamber having an upper opening therein, seal means surrounding said opening, said bin including a perforate bottom wall engaging said seal means in said lowered limit position of said carriage, and blower means communicating with said plenum chamber for blowing air thereinto and therefrom through said bottom wall of said bin in said lowered limit position of said carriage.

19. A mobile dump trailer comprising a chassis including ground-engaging wheel means, a guide frame fixed to and upstanding from one side portion of said chassis, a carriage mounted on said guide frame for rectilinear movement therealong between a raised limit position and a lowered limit position, a dump bin having an open top and pivotally mounted on said carriage for movement in unison with the latter between said raised and lowered limit positions thereof and being pivotally movable relative thereto between a load-carrying position and a dumping position, extensible and contractible carriage operating means including relatively reciprocable members respectively connected to said chassis and bin, said carriage operating means being extensible to move said bin and carriage in unison to the raised limit position of the latter on said guide frame followed automatically by pivotal movement of said bin to said dumping position thereof, and being contractible to pivot said bin from said dumping position to said load-carrying position thereof followed automatically by lowering of said bin and carriage in unison to the lowered limit position of the latter on said guide frame, control means selectively controlling extension and contraction of said carriage operating means, hitch means including a drawbar mounted on said chassis for reciprocation relative thereto between extended and retracted positions and adapted to be connected to a towing vehicle, extensible and retractable drawbar operating means operatively connected between said chassis and said drawbar to move the latter between said positions thereof, and drawbar latch means operable between said chassis and said drawbar, said drawbar latch means being operable to latch said drawbar in said retracted position thereof automatically in response to retraction of said drawbar operating means, and being operable to unlatch said drawbar automatically in response to extension of said drawbar operating means, and control means selectively controlling extension and retraction of said drawbar operating means.

20. The mobile dump trailer according to claim 19 wherein said drawbar latch means comprises a drawbar latch member mounted on said chassis for movement between latching and unlatching positions respectively relative to said drawbar, yieldable means biasing said drawbar latch member continuously toward said latching position thereof, and drawbar latch control means operable automatically in response to movement of said drawbar operating means between said positions thereof to control movement of said latch member between said positions thereof.

21. A wheel mounted mobile dump trailer comprising a chassis including means defining a plenum chamber having an upper opening therein, a dump bin having an open top and a perforate bottom wall, carriage means mounting said bin on said chassis for movement between a lowered load-carrying position in which said bottom wall of said bin is disposed opposite said opening and a raised dumping position, seal means surrounding said upper opening in said plenum chamber and engageable with said bottom wall of said bin in said lowered load-carrying position of the latter, and blower means mounted on said chassis communicating with said plenum chamber for blowing air therethrough and through said bottom wall of said bin in said lowered load-carrying position thereof.

22. A mobile dump trailer comprising a chassis including ground-engaging wheel means, guide frame means fixed to said chassis and extending upwardly therefrom, a carriage mounted on said guide frame means for rectilinear movement therealong between raised and lowered positions, said carriage including a portion thereof projecting from said guide frame means and being located laterally beyond said chassis at least to a position approximately over the center of said wheel means in said lowered position of said carriage, a dump bin having an open top and pivotally mounted on said portion of said carriage for movement in unison with the latter between said raised and lowered positions thereof and being pivotally movable relative thereto between a load-carrying position and a dumping position, and carriage operating means operatively connected between said chassis and said bin, said carriage operating means being operable to move said bin and carriage in unison to said raised position of the latter on said guide frame means followed automatically by pivotal movement of said bin to said dumping position thereof, and being operable to pivot said bin from said dumping position to said load-carrying position thereof followed automatically by lowering of said bin and carriage in unison to said lowered position of the latter on said guide frame means.

23. The mobile dump trailer according to claim 22 wherein said portion of said carriage is located laterally beyond said guide frame means in all positions of said carriage.

24. A mobile dump trailer comprising a chassis including ground-engaging wheel means, guide frame means fixed to said chassis and extending upwardly therefrom, a carriage mounted on said guide frame means for rectilinear movement therealong between raised and lowered positions, said carriage including a portion thereof projecting from said guide frame means and being located laterally beyond said chassis at least to a position approximately over the center of said wheel means in said lowered position of said carriage, a dump bin having an open top and pivotally mounted on said carriage for movement in unison with the latter between said raised and lowered positions thereof and being pivotally movable relative thereto between a load-carrying position and a dumping position, said top of said bin being disposed in a plane at least as high as the upper end of said guide frame means with said carriage in said lowered position thereof, and carriage operating means operatively connected between said chassis and said bin, said carriage operating means being operable to move said bin and carriage in unison to said raised position of the latter on said guide frame means followed automatically by pivotal movement of said bin to said dumping position thereof, and being operable to pivot said bin from said dumping position to said load-carrying position thereof followed automatically by lowering of said bin and carriage in unison to said lowered position of the latter on said guide frame means.

25. A mobile dump trailer comprising a chassis including ground-engaging wheel means, guide frame means fixed to said chassis and extending upwardly therefrom, a carriage mounted on said guide frame means for rectilinear movement therealong between raised and lowered positions, said carriage including a portion thereof projecting from said guide frame means and being located laterally beyond said chassis at least to a position approximately over the center of said wheel means in said lowered position of said carriage, a dump bin pivotally mounted on said carriage for movement in unison with the latter between said raised and lowered positions thereof and being pivotally movable relative thereto between a load-carrying position and a dumping position, and extensible and contractible carriage operating means including relatively reciprocable members, one of said members being pivotally connected directly to said chassis and the other of said members being pivotally connected directly to said bin, said carriage operating means being extensible to move said bin and carriage in unison to said raised position of the latter on said guide frame means followed automatically by pivotal movement of said bin to said dumping position thereof, and being contractible to pivot said bin from said dumping position to said load-carrying position thereof followed automatically by lowering of said bin and carriage in unison to said lowered position of the latter on said guide frame means.

26. The mobile dump trailer according to claim 25 wherein said pivotal connection of said other of said members to said bin is located between said guide frame means and said portion of said carriage with the latter in said lowered position thereof.

27. A mobile dump trailer comprising a chassis including ground-engaging wheel means, guide frame means fixed to said chassis and extending upwardly therefrom, a carriage mounted on said guide frame means for rectilinear movement therealong between raised and lowered positions, said carriage including a portion thereof projecting from said guide frame means and being located laterally beyond said chassis at least to a position approximately over the center of said wheel means in said lowered position of said carriage, a dump bin having an open top and pivotally mounted on said portion of said carriage for movement in unison with the latter between said raised and lowered positions thereof and being pivotally movable relative thereto between a load-carrying position and a dumping position, said top of said bin being disposed in a plane above the upper end of said guide frame means with said carriage in said lowered position thereof, and extensible and contractible carriage operating means including relatively reciprocable members, one of said members being pivotally connected directly to said chassis and the other of said members being pivotally connected directly to said bin adjacent said guide frame means with said carriage in said lowered position thereof, said carriage operating means being extensible to move said bin and carriage in unison to said raised position of the latter on said guide frame means followed automatically by pivotal movement of said bin to said dumping position thereof, and being contractible to pivot said bin from said dumping position to said load-carrying position thereof followed automatically by lowering of said bin and carriage in unison to said lowered position of the latter on said guide frame means, and control means selectively controlling extension and contraction of said carriage operating means.

28. The mobile dump trailer according to claim 27 further comprising carriage latch means operable between said carriage and said guide frame means, said carriage latch means being operable to latch said carriage in said raised position thereof automatically in response to initial pivotal movement of said bin from said load-carrying position toward said dumping position thereof, and to unlatch said carriage in said raised position thereof automatically in response to concluding pivotal movement of said bin from said dumping position to said load-carrying position thereof.

29. A mobile dump trailer comprising a chassis including ground-engaging wheel means, guide frame means supported on said chassis, carriage means, mounting means mounting said carriage means on said guide frame means for movement therealong between raised and lowered positions, said carriage means including a portion thereof spaced laterally from said guide frame means and the path of movement of said mounting means therealong, a dump bin pivotally mounted on said portion of said carriage means for movement in unison with the latter between said raised and lowered positions thereof and being pivotally movable relative thereto between a load-carrying position and a dumping position, and operating means operatively connected between said chassis and bin, said operating means being operable to move said bin and carriage means in unison to the raised position of the latter on said guide frame means followed automatically by pivotal movement of said bin to said dumping position thereof, and being operable to pivot said bin from said dumping position to said load-carrying position thereof followed automatically by movement of said bin and carriage means in unison to the lowered position of the latter on said guide frame means.

30. The mobile dump trailer according to claim 29 wherein said guide frame means is substantially upright relative to said chassis.

References Cited

UNITED STATES PATENTS

| | | | |
|---|---|---|---|
| 207,638 | 9/1878 | Arnold et al. | 34—236 X |
| 2,714,258 | 8/1955 | Smith et al. | |
| 2,777,212 | 1/1957 | McOmber | 34—233 X |
| 3,083,058 | 3/1963 | Walstrom et al. | 298—11 |
| 3,205,011 | 9/1965 | Diem | 298—11 X |

FOREIGN PATENTS 79,311   10/1962   France.

FREDERICK L. MATTESON, JR., *Primary Examiner.*

A. D. HERRMANN, *Assistant Examiner.*